Figure 1:
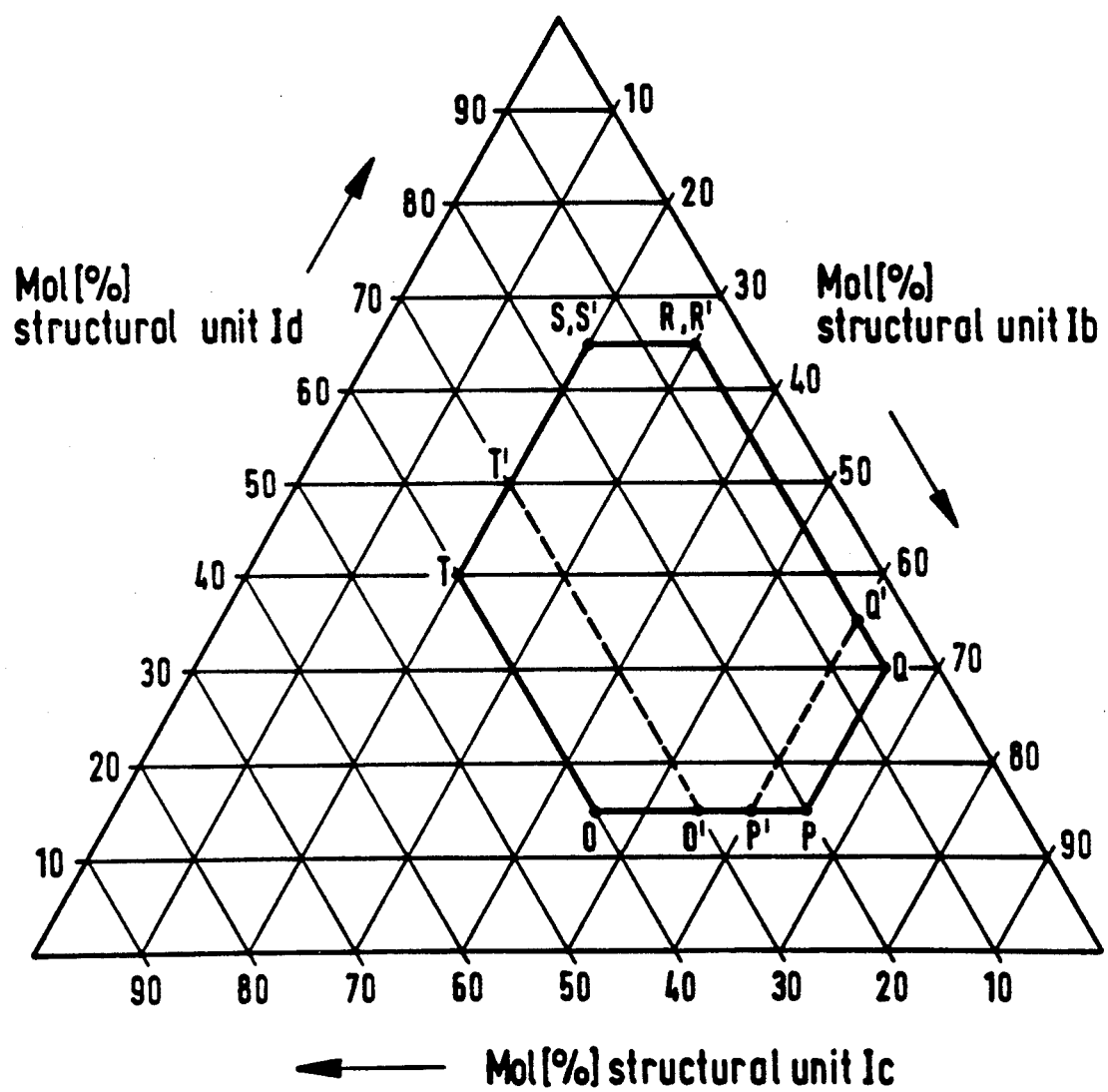

United States Patent [19]

Keil et al.

[11] Patent Number: 5,235,029

[45] Date of Patent: Aug. 10, 1993

[54] AROMATIC COPOLYAMIDE

[75] Inventors: Günter Keil, Hofheim am Taunus; Karl Heinrich, Grossaitingen, both of Fed. Rep. of Germany

[73] Assignee: Hoechst AG, Frankfurt, Fed. Rep. of Germany

[21] Appl. No.: 821,992

[22] Filed: Jan. 16, 1992

[30] Foreign Application Priority Data

Jan. 19, 1991 [DE] Fed. Rep. of Germany ........ 4101465

[51] Int. Cl.$^5$ .............................................. C08G 69/32
[52] U.S. Cl. ................................ 528/340; 528/183; 528/338; 528/339; 528/344; 528/346; 528/347; 528/348; 528/349
[58] Field of Search ............... 528/340, 338, 339, 344, 528/348, 349, 346, 347, 183

[56] References Cited

U.S. PATENT DOCUMENTS 5,006,629  4/1991  Santa et al. ......................... 528/340

*Primary Examiner*—Harold D. Anderson
*Attorney, Agent, or Firm*—Connolly and Hutz

[57] ABSTRACT

There are described copolyamides which are soluble in organic polyamide solvents and contain recurring structural units of the formulae Ia, Ib, Ic and Id or Ia, Ib, Id and Ig or Ia, Ib, Ic, Id and Ig and optionally of the formulae Ie and/or If $$-OC-Ar^1-CO- \quad (Ia),$$

$$-NH-Ar^2-NH- \quad (Ib),$$

$$-NH-Ar^3-NH- \quad (Ic),$$

(Id)

$$-OC-R^2-CO- \quad (Ie),$$

$$-NH-R^3-NH- \quad (If),$$

$$-OC-Ar^4-CO- \quad (Ig),$$

where $Ar^1$ and $Ar^2$ are each independently of the other divalent aromatic radicals whose valence bonds are in the para or a comparable coaxial or parallel position relative to one another, $Ar^3$ and $Ar^4$ are each independently of the other divalent radicals whose valence bonds are in the meta or a comparable kinked position relative to one another, $R^1$ is lower alkyl, lower alkoxy or halogen, and $R^2$ and $R^3$ are each independently of the other divalent aliphatic, cycloaliphatic or araliphatic radicals.

Through specific choice or the monomer composition it is possible to obtain soluble copolyamides which can be processed into filaments and fibers of high strength.

15 Claims, 2 Drawing Sheets

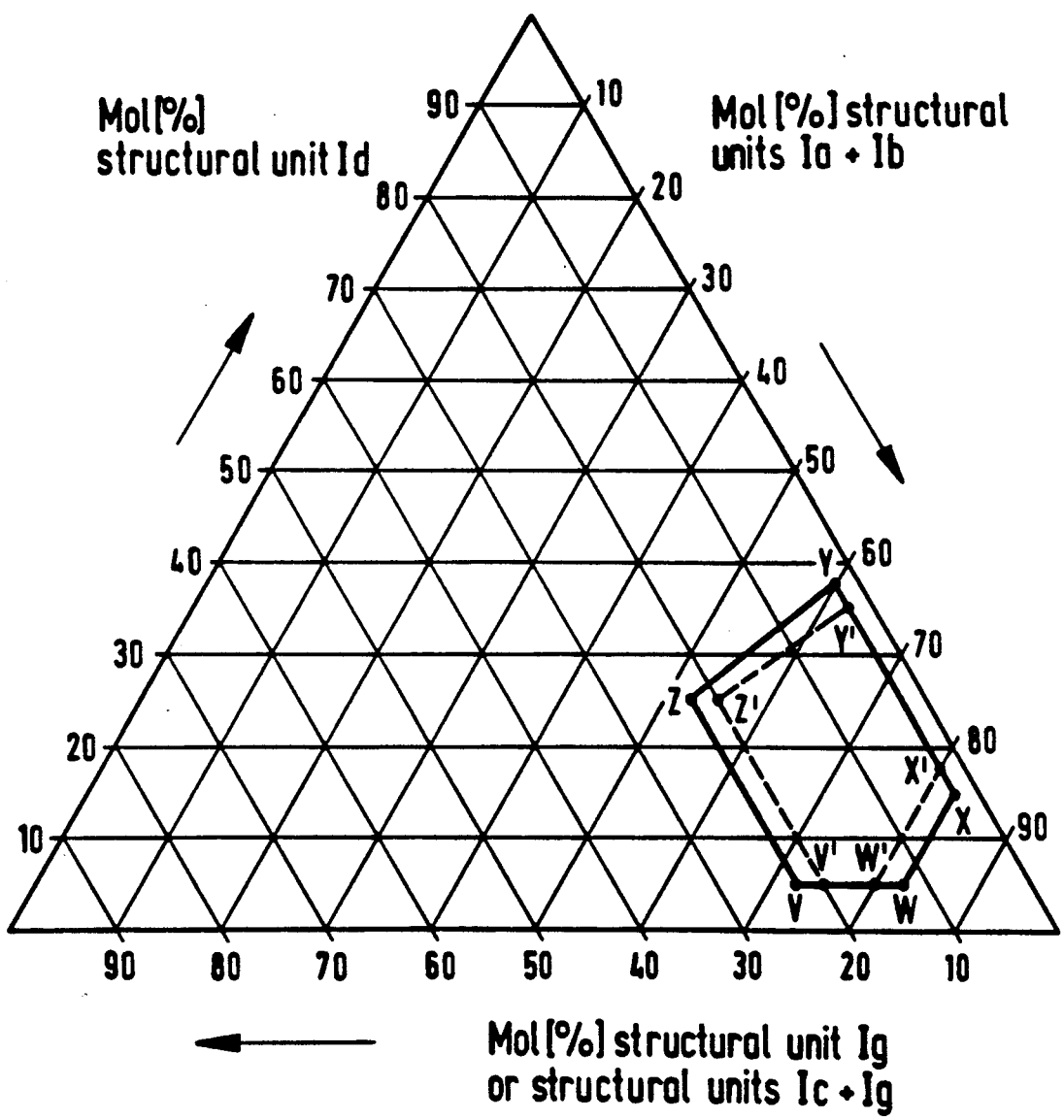

AROMATIC COPOLYAMIDE

The invention relates to novel aromatic polyamides of the dicarboxylic acid-diamine type, processes for preparing them, structures formed therefrom such as filaments, fibers, pulp, films, sheets and membranes, and also processes for preparing them.

Aromatic polyamides (aramids) are, as will be known, raw materials of high thermal and chemical stability and low flammability. For instance, fibers and sheets from such raw materials have very good mechanical properties, such as high strength and a high initial modulus (modulus of elasticity), and are highly suitable for technical uses, for example for reinforcing plastics or as filter materials.

It is known that aramid filaments or fibers of high strength and a very high initial modulus can be prepared when the amide bonds are coaxial or virtually parallel to one another, thereby forming rigid, rodlike polymer modules. Typical polyamide fibers of this kind are made for example of poly(p-phenyleneterephthalamide). Such filaments are described for example in German Patent 2,219,703.

This product has a number of advantages, but the preparation of the required polyamide and the processing thereof are very difficult. For instance, because of low solubility in polar organic solvents, even in the presence of inorganic salts such as calcium chloride or lithium chloride as solubilizers, this polymer precipitates from the reaction medium very shortly after it has been formed. It has to be isolated, washed, dried and then dissolved again in a spinning solvent. The preferred solvent for preparing spinning solutions is concentrated sulfuric acid, which presents particular handling (workplace safety, corrosion) and waste disposal problems.

Attempts were therefore made to bypass these difficulties by developing copolyamides which are readily soluble in the known amide solvents, which are also readily spinnable and whose filaments, after drawing to a high draw ratio, have high strength values and initial moduli.

For instance, DE-A-21 44 126=U.S. Pat. No. 3,801,545 describes the preparation of soluble aromatic polyamides whereby substituted 3-(p-aminophenoxy)-4-aminobenzanilides reacted with terephthaloyl chloride give readily soluble polyamides which are spinnable and drawable to filaments of moderately high strength and initial moduli.

The increased solubility here is due to the meta orientation and the oxygen bridge atom. German Patent 2,556,885, German Offenlegungsschrift 3,007,063 and U.S. Pat. No. 4,355,151 describe copolyamides of terephthalic acid (TPA), p-phenylenediamine (PPD) and 3,4'-diaminodiphenyl ether (3,4'-DADPE) which give readily spinnable isoptropic solutions in amide solvents. High strength and module can be conferred on the filaments by drawing to a very high draw ratio. The disadvantage of the aforementioned processes is that the various amines required can only be prepared and purified by very costly processes.

In EP-A-0199090 the increased solubility of otherwise rigid molecules is achieved through incorporation of compounds of the structure $H_2N-Ar-X-AR-NH_2$, where X can be $-CH_2-$ or $-O-C_6H_4-O-$.

A compound which is very readily and inexpensively obtainable and which on incorporation into an aramid brings about increased solubility through a kink in the polymer chain is m-phenylenediamine (MPD). Unfortunately, MPD polyamides usually have fairly poor strength properties. For instance, the known poly(m-phenyleneisophthalamide), which is readily soluble, gives filament strengths of only 40–70 cN/tex (cf. for example GB-A-917-889).

DE-A-2 566 883, comparative experiment 6, shows that a coterephthalamide of 80% PPD and 20% MPD gives filaments having a strength of 73 cN/tex. Comparative experiment 7 from the same reference shows that a coterephthalamide of 50% PPD and 50% MPD gives filaments having a strength of 71 cN/tex. Finally, comparative experiment 8 of the cited specification describes a terephthalamide of 100% MPD and a filament strength of 75 cN/tex.

DE-A-30 07 063 describes the use of MPD as well as the similarly solubilizing and expensive-to-prepare 3,4'-diaminodiphenyl ether and a rigid diamine. The additional incorporation of MPD in an already soluble aramid formed from PPD and 3,4'-DADPE merely brings about a slight increase in the breaking extension and a decrease in the tenacity. The rigid diamines used also include inter alia the highly toxic carcinogen benzidine.

It is therefore an object of the present invention to find aromatic copolyamides which are convertible with the use of amide solvents into formed structures which then have a number of notable physical properties. It should be possible to prepare filaments and fibers which, following appropriate drawing operations, have in particular high strengths and high initial moduli. The monomers required for preparing the copolyamides shall be readily accessible, and the polymer solutions obtained by polycondensation shall, following filtration and appropriate deaeration, be directly spinnable or formable.

Surprisingly, and despite the above-described results, it has now been found that readily soluble aromatic copolyamides which contain kinked monomer units and which are processible into formed structures such as filaments, pulp and sheets of high strength are obtainable by using selected combinations of monomers in selected proportions.

The invention in one aspect relates to copolyamides which are soluble in organic polyamide solvents and have an inherent viscosity, measured on solutions of 0.5 g of polyamide in 100 ml of 98% sulfuric acid at 25° C., of about 3.5 to 6.6 dl/g, containing the recurring structural units of the formulae Ia, Ib, Ic and Id and optionally the recurring structural units of the formula Ie and/or If

$-OC-Ar^1-CO-$ (Ia),

$-NH-Ar^2-NH-$ (Ib),

$-NH-Ar^3-NH-$ (Ic),

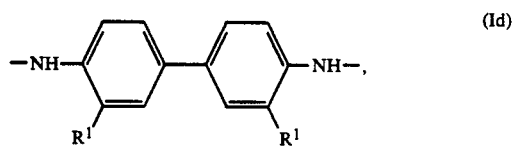

(Id)

—OC—R²—CO— (Ie),

—NH—R³—NH— (If), where the sum total of the recurring structural units of the formulae Ia, Ib, Ic and Id is at least 95 mol % and the recurring structural units of the formulae Ie and/or If can be up to 5 mol % and the mole fraction of the recurring structural units of the formulae Ia and optionally Ie corresponds substantially of the mole fraction of the recurring structural units Ib, Ic, Id and optionally If, and where $Ar^1$ is a divalent aromatic radical whose valence bonds are in the para or a comparable coaxial or parallel position to one another and which optionally has one or more substituents which are inert toward carbonyl chlorides, $Ar^2$ has one of the meanings defined for $Ar^1$, $Ar^3$ is a divalent aromatic radical whose valence bonds are in the meta or a comparable kinked position to one another and which optionally has one or more substituents which are inert toward carbonyl chlorides, $R^1$ is a lower alkyl radical, a lower alkoxy radical or a halogen atom, $R^2$ is a divalent aliphatic, cycloaliphatic or araliphatic radical, and $R^3$ has one of the meanings defined for $R^2$, with the proviso that within one and the same polymer molecule the radicals $Ar^1$, $Ar^2$, $Ar^3$, $R^1$, $R^2$ and $R^3$ can be different within the given definitions and that the proportions of the recurring structural units of the formulae Ib, Ic and Id, based on the total amount of these structural units, are selected in such a way that they lie within the corner points of the following region:

point O corresponds to 45 mol % of the radical of the formula Ib, 40 mol % of the radical of the formula Ic and 15 mol % of the radical of the formula Id;

point P corresponds to 65 mol % of the radical of the formula Ib, 20 mol % of the radical of the formula Ic and 15 mol % of the radical of the formula Id;

point Q corresponds to 65 mol % of the radical of the formula Ib, 5 mol % of the radical of the formula Ic and 30 mol % of the radical of the formula Id;

point R corresponds to 30 mol % of the radical of the formula Ib, 5 mol % of the radical of the formula Ic and 65 mol % of the radical of the formula Id;

point S corresponds to 20 mol % of the radical of the formula Ib, 15 mol % of the radical of the formula Ic and 65 mol % of the radical of the formula Id; and point T corresponds to 20 mol % of the radical of the formula Ib, 40 mol % of the radical of the formula Ic and 40 mol % of the radical of the formula Id.

In a further aspect the invention relates to copolyamides which are soluble in organic polyamide solvents and have an inherent viscosity, measured on solutions of 0.5 g of polyamide in 100 ml of 98% sulfuric acid at 25° C., of about 3.5 to 6.6 dl/g, containing the recurring structural units of the formula Ia, Ib, Id and Ig and optionally the recurring structural units of the formulae Ic and/or Ie and/or If —OC—Ar¹—C— (Ia), —NH—Ar²—NH— (Ib), —NH—Ar³—NH— (Ic),

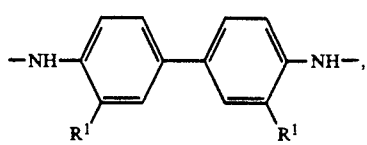

(Id)

—OC—R²—CO— (Ie),

—NH—R³—NH— (If),

—OC—Ar⁴—CO— (Ig), where the sum total of the recurring structural units of the formulae Ia, Ib, Id and Ig and optionally Ic is at least 95 mol % and the recurring structural units of the formulae Ie and/or If can be up to 5 mol % and the mole fraction of the recurring structural units of the formulae Ia and Ig and optionally Ie corresponds substantially to the mole fraction of the recurring structural units Ib and Id and optionally Ic and/or If, and where $Ar^1$, $Ar^2$, $Ar^3$, $R^1$, $R^2$ and $R^3$ are each as defined above, $Ar^4$ is a divalent aromatic radical whose valence bonds are in the meta or in a comparable kinked position relative to one another and which optionally has one or more substituents which are inert toward carbonyl chlorides, with the proviso that within one and the same polymer molecule the radicals $Ar^1$, $Ar^2$, $Ar^3$, $Ar^4$, $R^1$, $R^2$ and $R^3$ can be different within the given definitions and that the proportions of the recurring structural units of formulae Ia, Ib, Id and Ig and optionally Ic, based on the total amount of these structural units, are selected in such a way that they lie within the corner points of the following region:

point V corresponds to 72.5 mol % of the sum total of the recurring structural units of the formulae Ia and Ib, 22.5 mol % of the recurring structural units of the formula Ig or the sum total of the recurring structural units of the formulae Ic and Ig, and 5 mol % of the recurring structural units of the formula Id;

point W corresponds to 82.5 mol % of the sum total of the recurring structural units of the formulae Ia and Ib, 12.5 mol % of the recurring structural units of the formula Ig or the sum total of the recurring structural units of the formulae Ic and Ig, and 5 mol % of the recurring structural units of the formula Id;

point X corresponds to 82.5 mol % of the sum total of the recurring structural units of the formulae Ia and Ib, 2.5 mol % of the recurring structural units of the formula Ig or the sum total of the recurring structural units of the formulae Ic and Ig, and 15 mol % of the recurring structural units of the formula Id;

point Y corresponds to 60 mol % of the sum total of the recurring structural units of the formulae Ia and Ib, 2.5 mol % of the recurring structural units of the formula Ig or the sum total of the recurring structural units of the formulae Ic and Ig, and 37.5 mol % of the recurring structural units of the formula Id;

point Z corresponds to 52.5 mol % of the sum total of the recurring structural units of the formulae Ia and Ib, 22.5 mol % of the recurring structural units of the formula Ig or the sum total of the recurring structural units of the formulae Ic and Ig, and 25 mol % of the recurring structural units of the formula Id.

If any substituents in the radicals $Ar^1$, $Ar^2$, $Ar^3$ or $Ar^4$ are radicals which are inert toward carbonyl chlorides, these radicals can be monovalent inorganic radicals, such as halogen, or monovalent organic radicals, such as alkyl, alkoxy, bis(n-alkyl)amino, bis(N-alkyl)amino or nitrile groups. The expression "radical inert toward carbonyl chlorides" means that these substituents are practically nonreactive under the preparation and processing conditions for the copolyamides according to the present invention.

Preferred inert radicals are chlorine or $C_1$–$C_6$-alkyl or $C_1$–$C_6$-alkoxy, in particular straight-chain $C_1$–$C_6$-alkyl or alkoxy. Examples thereof are methyl, ethyl, n-propyl, isopropyl, n-butyl, n-pentyl and n-hexyl or methoxy, ethoxy, n-propyloxy, isopropyloxy, n-butyloxy, n-pentyloxy or n-hexyloxy.

Examples of $R^1$ are chlorine or $C_1$–$C_6$-alkyl or $C_1$–$C_6$-alkoxy, as enumerated above.

Particularly preferred inert radicals or radicals $R^1$ are chlorine, methoxy or methyl.

If any radicals are divalent aromatic radicals whose valence bonds are in the para or in a comparable coaxial or parallel position relative to one another, these radicals are monocyclic or polycyclic aromatic hydrocarbon radicals or heterocyclic-aromatic radicals which can be monocyclic or polycyclic. Heterocyclic-aromatic radicals have in particular one or two oxygen, nitrogen or sulfur atoms in the aromatic nucleus.

Polycyclic aromatic radicals can be fused to one another or bonded linearly to one another via C—C bonds or via essentially linear bridging groups, such as —O—, —S—, —SO₂— or —CO—NH— groups.

The valence bonds which are in coaxial or parallel position relative to one another point in opposite directions. An example of coaxial bonds pointing in opposite directions are the 4,4'-biphenylene bonds. An example of parallel bonds pointing in opposite directions are the 1,5- or 2,6-naphthalene bonds, whereas the 1,8-naphthalene bonds are parallel but point in the same direction.

Examples of preferred divalent aromatic radicals whose valence bonds are in the para or a comparable coaxial or parallel position relative to one another are monocyclic aromatic radicals having mutually para-disposed free valences, in particular 1,4-phenylene, or bicyclic fused aromatic radicals having parallel bonds pointing in opposite directions, in particular 1,4- 1,5- and 2,6-naphthylene, or bicyclic aromatic radicals linked via a C—C bond or via a —CO—NH— group with coaxial bonds pointing in opposite directions, in particular 4,4'-biphenylene or a radical of 4,4'-diaminobenzanilide.

Particularly preferred radicals $Ar^1$ and $Ar^2$ are 1,4-phenylene and the radical of 4,4'-diaminobenzanilide. $Ar^1$ is preferably 1,4-phenylene.

If any radicals are divalent aromatic radicals whose valence bonds are in the meta or in a comparable kinked position relative to one another, they are monocyclic or polycyclic aromatic hydrocarbon radicals or heterocyclic-aromatic radicals which can be monocyclic or polycyclic. Heterocyclic-aromatic radicals have in particular one or two oxygen, nitrogen or sulfur atoms in the aromatic nucleus.

Polycyclic aromatic radicals can be fused to one another or linked to one another via C—C bonds or via bridging groups, such as —O—, —CH₂—, —CO—NH—, —S—, —CO— or —SO₂—.

Examples of polycyclic radicals whose valence bonds are in a kinked position which is comparable to the meta position are 1,6-naphthylene, 2,7-naphthylene or 3,4'-biphenylene.

A preferred example of a monocyclic aromatic radical of this type is 1,3-phenylene.

Preferred radicals of the formula Id are those where $R^1$ is chlorine or straight-chain $C_1$–$C_6$-alkyl, in particular methyl, or straight-chain $C_1$–$C_6$-alkoxy, in particular methoxy.

The polyamides according to the present invention may contain, as well as the substituted radical Id, unsubstituted radicals and substituted side by side in varying proportions.

More particularly, the polyamide may contain one or more kinds of substituted radicals $Ar^1$, $Ar^2$, $Ar^3$ and/or $Ar^4$; for example, it may contain exclusively methyl-substituted radicals or it may contain proportions of radicals having various alkyl substituents and/or having halogen substituents.

However, as well as the substituted radical Id the polyamides according to the present invention may contain exclusively substituted or unsubstituted radicals $Ar^1$, $Ar^2$, $Ar^3$ and/or $Ar^4$. For cost reasons preference is given to those polyamides according to the present invention which besides Id contain only unsubstituted radicals or which contain up to about 30 mol % of substituted radicals, based on the polymer.

As well as the recurring structural units of the formulae Ia, Ib, Ic and Id (variant I) or of the formulae Ia, Ib, Id and Ig or Ia, Ib, Ic, Id and Ig (variant II), which are each present in a polymer molecule in a proportion of at least 95 mol %, the copolyamides according to the present invention can contain up to 5 mol % of nonaromatic dicarboxylic and/or diamine units of the formulae Ie or If.

These units can be for example radicals of aliphatic α,ω-dicarboxylic acids or α,ω-diamines, such as radicals of adipic acid or sebacic acid or of 1,6-diaminohexane; they can also be radicals of cycloaliphatic dicarboxylic acids or diamines, for example radicals of hexahydrophthalic acid or of 1,4-cyclohexanediamine; or they can be radicals of araliphatic dicarboxylic acids or diamines, for example radicals of xylylenedicarboxylic acids or of xylylenediamine.

These radicals may likewise optionally contain substituents which are inert toward carbonyl chlorides.

In the case of the copolyamides of variant II, the kinked component can be a recurring structural unit of the formula Ig or of the formula Ic and Ig.

The amount of diamine used is not freely choosable but can be chosen only within certain mole percent regions, based on the total molar amount of diamine component. The concentration region required according to the present invention is characterized by the above-defined corner points, O, P, Q, R, S and T on the one hand and V, W, X, Y and Z on the other; the regions are also shown graphically in the accompanying FIGS. 1 and 2 in a triangular coordinate system.

Here the quantities for variant I are each based on the proportions of divalent aromatic diamine radicals, while the quantities for variant II are based on the proportions of divalent aromatic dicarboxylic acid radicals and divalent aromatic diamine radicals.

Formed structures in aromatic copolyamides according to the present invention are obtained with excellent properties in particular when the individual portions of the diamine components relative to the total amount of the diamine components in mol % lie within a narrower region which is defined by the following corner points, again depicted in FIGS. 1 and 2:

point O' corresponds to 55 mol % of the radicals of formula Ib, 30 mol % of the radicals of formula Ic and 15 mol % of the radicals of formula Id, point P' corresponds to 60 mol % of the radicals of formula Ib, 25 mol % of the radicals of formula Ic and 15 mol % of the radicals of formula Id, point Q' corresponds to 60 mol % of the radicals of formula Ib, 5 mol % of the radicals of formula Ic and 35 mol % of the radicals of formula Id, point R' corresponds to 30 mol % of the radicals of formula Ib, 5 mol % of the radicals of formula Ic and 65 mol % of the radicals of formula Id, point S' corresponds to 20 mol % of the radicals of formula Ib, 15 mol % of the radicals of formula Ic and 65 mol % of the radicals of formula Id, point T' corresponds to 20 mol % of the radicals of formula Ib, 30 mol % of the radicals of formula Ic and 50 mol % of the radicals of formula Id, or point V' corresponds to 75 mol % of the sum total of the recurring structural units of the formula Ia and Ib, 20 mol % of the recurring structural units of the formula Ig or the sum total of the recurring structural units of the formulae Ic and Ig, and 5 mol % of the recurring structural unit of the formula Id;

point W' corresponds to 80 mol % of the sum total of the recurring structural units of the formula Ia and Ib, 15 mol % of the recurring structural units of the formula Ig or the sum total of the recurring structural units of the formulae Ic and Ig, and 5 mol % of the recurring structural unit of the formula Id;

point X' corresponds to 80 mol % of the sum total of the recurring structural units of the formula Ia and Ib, 2.5 mol % of the recurring structural units of the formula Ig or the sum total of the recurring structural units of the formulae Ic and Ig, and 17.5 mol % of the recurring structural unit of the formula Id;

point Y' corresponds to 62.5 mol % of the sum total of the recurring structural units of the formula Ia and Ib, 2.5 mol % of the recurring structural units of the formula Ig or the sum total of the recurring structural units of the formulae Ic and Ig, and 35 mol % of the recurring structural unit of the formula Id;

point Z' corresponds to 55 mol % of the sum total of the recurring structural units of the formula Ia and Ib, 20 mol % of the recurring structural units of the formula Ig or the sum total of the recurring structural units of the formulae Ic and Ig, and 25 mol % of the recurring structural unit of the formula Id;

The excellent properties of the formed structures according to the present invention are based on the incorporation of the recurring structural units Ia, Ib, Ic and Id or Ia, Ib, Id and Ig or Ia, Ib, Ic, Id and Ig within the indicated limits. Aromatic polyamides based on individual ones of these recurring structural units are generally known. They have no outstanding properties.

For instance, the use of the amine component Ib, i.e. p-phenylenediamine for example, and of the acid component Ia, e.g. terephthaloyl chloride, is widely known and also described for example in the above-cited German Patent 2,219,703. As mentioned earlier, polyamides containing only this amine unit together with an aromatic dicarboxylic acid radical are virtually no longer soluble in aprotic solvents of the amide type. However, a spinning solution can be obtained using concentrated sulfuric acid (DE-A-19 29 713).

The use of the amine component Ic, i.e. m-phenylenediamine for example, is generally known. For instance, filaments made of m-phenyleneisophthalamide for commercially obtainable. They also feature the use of acid components Ig, i.e. isophthaloyl chloride for example.

The prior art also reveals the suitability of benzidines for use as aromatic polyamide component. A spinning solution is preparable using fuming sulfuric acid.

Benzidines are inter alia described as cocomponent in EP-A-0,199,090. Comparative experiment 6 therein also says that a homopolyamide from terephthaloyl chloride and 3,3'-dimethylbenzidine is insoluble in the synthesis solvent and accordingly not spinnable therefrom.

As is evident from the cited references, filaments of the polyamides in question spun from organic solutions have without exception only moderate properties, while filaments wheras made from polyamides prepared according to the present invention by using selected diamines and dicarboxylic acids in certain proportions are surprisingly notable for high strength and high solubility. The filaments show high drawability.

The polyamides according to the present invention can be prepared by any conventional polycondensation process. To prepare the copolyamides containing the recurring structural units Ia, Ib, Ic and Id and optionally Ie and/or If, it is advantageous to react a dicarbonyl dichloride of the formula II and optionally of the formula VII with a mixture of the diamines of the formulae III, IV and V and optionally VI

(II)         (III)         (IV)

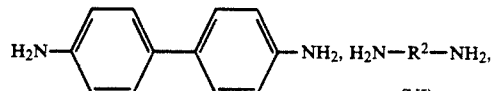

(V)

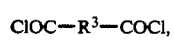

(VII)

where $Ar^1$ to $Ar^3$ and $R^1$ to $R^3$ are each as defined above.

To prepare the copolyamides containing the recurring structural units Ia, Ib, Id and Ig and optionally Ic and/or Ie and/or If, a dicarbonyl dichloride of the formula II and optionally VII as defined above and a dicarbonyl dichloride of the formula VIII are reacted with a mixture of the diamines of the formulae II and V and optionally IV and/or VI as defined above

 (VIII), where $Ar^4$ is as defined above.

The dicarbonyl dichlorides of the formulae II, VII and VIII and also the diamines of the formulae III, IV, V and VI can also be used in the form of mixtures.

Here the mixing ratios of the diamines III, IV and V on the one hand and III and V on the other must in each case be chosen in such a way as to produce polyamides having the above-defined proportions of structural units.

It is self-evident to a person skilled in the art that the sum total of all the structural units derived from aromatic acids and the sum total of all the structural units derived from aromatic amines will be essentially the same, i.e. within about 1%, preferably about 0.2% of each other, in particular for the purposes of practical measuring and metering.

The molecular weight of the resulting polyamide can be controlled inter alia via the choice of the ratio of aromatic acid to aromatic amine. These selection criteria are known to the person skilled in the art of polycondensation.

Examples of suitable aromatic dicarbonyl dichlorides of the formula II are the dichlorides of 4,4'-thiodiphenyldicarboxylic acid, 4,4'-oxydiphenyldicarboxylic acid, naphthalene-1,4-dicarboxylic acid, naphthalene-1,5-dicarboxylic acid, naphthalene-2,6-dicarboxylic acid, biphenyl-4,4'-dicarboxylic acid, 2-chloroterephthalic acid and in particular of terephthalic acid.

Examples of suitable aromatic dicarbonyl dichlorides of the formula VIII are the dichlorides of naphthalene-1,6-dicarboxylic acid, naphthalene-1,7-dicarboxylic acid, naphthalene-2,7-dicarboxylic acid, biphenyl-3,4'-dicarboxylic acid and in particular of isophthalic acid.

Examples of suitable diamines of the formula III are naphthalene-1,4-diamine, naphthalene-1,5-diamine, naphthalene-2,6-diamine and in particular 4,4'-diaminobenzanilide and p-phenylenediamine.

Examples of suitable diamines of the formula IV are naphthalene-1,6-diamine, naphthalene-1,7-diamine, naphthalene-2,7-diamine, biphenyl-3,4'-diamine, 3,4'-diaminobenzanilide and also 2,4-diaminoanisole or 3,5-diamino-N,N-diethylbenzamide and in particular m-phenylenediamine.

Examples of suitable diamines of the formula V are 3,3'-dichlorobenzidine, 3,3'-dimethoxybenzidine and in particular 3,3'-dimethylbenzidine.

The copolycondensation of the above-described monomer compounds is customarily carried out as a solution polycondensation.

For this purpose, the monomeric compounds to be reacted with each other are in general dissolved in an organic solvent. This organic solvent preferably contains at least one solvent of the amide type, for example N-methyl-2-pyrrolidone, N,N-dimethylacetamide, tetramethylurea, N-methyl-2-piperidone, N,N'-dimethylethyleneurea, N,N,N',N'-tetramethylmaleiamide, N-methylcaprolactam, N-acetylpyrrolidine, N,N-diethylacetamide, N-ethyl-2-pyrrolidone, N,N'-dimethylpropionamide, N,N-dimethylisobutylamide or N,N'-dimethylpropyleneurea. Of importance for the process according to the present invention are the preferred organic solvents N-methyl-2-pyrrolidone, N,N-dimethylacetamide and a mixture thereof.

In a preferred form of carrying out the solution polycondensation, the aromatic monomeric diamines are dissolved in an amide solvent. The solution thus obtained is then mixed with the at least one aromatic monomeric compound in the form of an aromatic dicarbonyl dihalide by vigorous stirring in order to initiate the copolycondensation.

Here the amide solvent acts not only as solvent for the aromatic monomeric compounds and the aromatic copolyamide obtained therefrom but also as acid acceptor for a hydrogen halide, for example for hydrogen chloride, which is formed as by-product of a copolycondensation of the aromatic monomeric compounds. In some cases it can be advantageous to use a solubility-promoting additive, for example a metal halide of one of the metals of group I or II of the periodic table, which is added to the copolymerization mixture before, during or after the copolymerization. Examples of such additives are alkali metal compounds, such as lithium chloride, or alkaline earth metal compounds such as calcium chloride. The alkali metal or alkaline earth metal compounds serve to increase the solubility of the copolyamide being formed.

The polycondensation temperatures in the case of a solution polymerization are customarily between $-20°$ C. and $+120°$ C., preferably between $+10°$ C. and $+100°$ C. Particularly good results are obtained on using N-methylpyrrolidone at reaction temperatures between $+10°$ C. and $+80°$ C.

Polycondensation reactions are preferably carried out in such a way that, after the reaction has ended, from 2 to 15, preferably from 3.5 to 10, % by weight of polycondensate are present in the solution. Particularly good results are obtained with concentrations of from 5.0 to 7.5% by weight.

In the course of the polycondensation an increase takes place in the molecular weight of the polymer and hence also in the viscosity of the reaction batch.

The polymer molecule has reached an adequate chain length when the viscosity of the polymer solution obtained in the course of the polycondensation corresponds to an inherent viscosity of the polymer of about 3.5 to 6.6 dl/g; the upper limit of the viscosity preferably corresponds to 6.0 dl/g.

The inherent viscosity is defined as $$\eta_{inh} = \frac{\ln \eta_{rel}}{c}$$

where $\eta_{rel}$ is the relative viscosity and c is the concentration in g/dl.

For the purposes of the present invention the inherent viscosity is determined on solutions of 0.5 g of polymer in 100 ml of 98% by weight sulfuric acid at 25° C.

The outlined process for preparing aromatic polyamides, which is known per se, likewise forms part of the subject-matter of the present invention inasmuch as it concerns the preparation of the above-described aromatic polyamides according to the present invention.

When the polymer solution has reached the viscosity required for further processing, the polycondensation can be stopped in a conventional manner by adding monofunctional compounds, for example benzoyl chloride or acetyl chloride. Subsequently the hydrogen chloride formed, which is bound loosely to the amide solvent, can be neutralized by adding basic substances. Suitable for this purpose are for example lithium hydroxide, calcium hydroxide, but in particular calcium oxide.

The aromatic copolyamide obtained on carrying out the process according to the present invention can be isolated from the copolymerization mixture by a separating process, for example by precipitation. To prepare a solution for extruding the copolyamide, the copolyamide thus isolated is then dissolved in a suitable organic solvent.

In those cases, however, where the copolyamide according to the present invention is prepared by the method of solution polycondensation, the copolyamide, being readily soluble in the solvent for the polycondensation, is of course already in the completely dissolved state and therefore, in the industrial practice of the process according to the present invention, it is advantageous that the as-polycondensed mixture is directly used as solution for extruding the aromatic copolyamide.

The copolyamide according to the present invention is readily soluble in an organic solvent, for example in organic solvents of the amide type, and possesses excellent heat resistance and superior chemical resistance. The copolyamide according to the present invention is particularly useful for preparing various formed articles, for example filaments, fibers, pulp, yarns, films and sheets, which likewise form part of the subject-matter of the present invention. These structures not only possess excellent heat resistance and chemical resistance but also have superior mechanical properties, for example in tensile strength and modulus of elasticity. The solution of the copolyamide can likewise be used in various ways, for example for producing fibers, films, sheetlike elements, fibrous materials and other formed articles.

To prepare the solution for extruding the aromatic copolyamide the solvent used is preferably a solvent of the amide type, in particular one of the abovementioned solvents of the amide type or a mixture of two or more of said compounds.

To prepare the extruding solution it is advantageous to maintain the concentration of the aromatic copolyamide within the range between 4 and 20% by weight, in particular between 6 and 12% by weight. If necessary, the extruding solution may contain an additive for promoting solubility, in which case at least one metal halide of a metal of groups I and II of the periodic table may be used, for example lithium chloride, calcium chloride or magnesium bromide, in a concentration between 0.2 and 10%, preferably between 0.5 and 5%, based on the total weight of the extruding solution. The solubility promoter also aids the stability of the extruding solution at elevated temperature.

The extruding of the solution to give a formed article can be effected by any suitable dry, wet or dry-wet process. In those cases where a wet process is used, for example in order to form the extruding solution into filaments, the extruding or, more precisely, the spinning solution is extruded or spun through a die, for example a spinning die or spinneret, into a coagulating liquid. Here it is usually advantageous for the coagulation liquid to be water or an aqueous solution containing a polar organic solvent. This polar organic solvent can be selected from among the same amide solvents which are usually used for dissolving the aromatic copolyamide. A preferred polar organic solvent used in the coagulation liquid is preferably the same solvent as is present in the extruding solution. The coagulation liquid is preferably used at a temperature between 0° C. and the atmospheric pressure boiling point of the coagulation liquid. The polar organic solvent is preferably in the coagulation liquid in a concentration between 50% by weight, in particular between 50% by weight and less, in particular between 30% by weight and less.

When the copolyamide in the extruding solution has a certain composition or when the extruding solution contains certain kinds of metal halides and/or hydrogen halides in a certain amount, the coagulation liquid will in some instances diffuse to an excessive, frequently undesirable, degree into the extruded strand. This phenomenon causes the coagulated article to have a loose internal structure so that its mechanical strength is so low that it cannot be hauled off smoothly without breaking. In such a case it is advantageous for the coagulation liquid to contain an additive which retards the rate of coagulation, for which purpose it is possible to use at least one of the following substances: lithium chloride, sodium chloride, calcium chloride, magnesium chloride, zinc chloride, strontium chloride, aluminum chloride, tin(II) chloride, nickel chloride, calcium bromide, calcium nitrate, zinc nitrate, aluminum nitrate. Particularly advantageous coagulation retarders are magnesium chloride, calcium chloride, zinc chloride and aluminum chloride.

The above-described extrusion process is particularly suitable for preparing films or filaments from an extrudable solution.

In the preparation of filaments from the copolyamide according to the present invention, the extruding or spinning solution is extruded or spun through a spinneret with a plurality of holes, the filamentous streams of the spun solution being consolidated either in one of the abovementioned coagulation liquids (wet process) or in an evaporation-conducive atmosphere (dry process). The spinning can be effected using a customary horizontal or vertical wet-spinning machine, a dry jet wet-spinning machine or a spinning machine in which the material flows downward under tension. A likewise suitable variant is the dry-jet wet-spinning process as described for example in U.S. Pat. No. 3,414,645.

In the wet-spinning of an aromatic copolyamide according to the present invention, coagulation is preferably effected using a coagulation liquid containing a coagulation, promoting additive and chemical coagulation is followed by a further coagulation step in the course of which the coagulating filaments of the copolyamide pass into a waterbath which is maintained at a temperature between 0° and 100° C. This additional coagulation step serves to complete the coagulation by removing the solvent. Also, coagulation promoter additives, if such materials are used, are washed out of the coagulated filaments.

From the foregoing description it is clear that the copolyamide according to the present invention is readily processible into filaments using customary spinning processes and apparatus without a hazardous or harmful solvent, for example concentrated sulfuric acid, having to be used. This reduces the danger to the operating personnel. Also, the filaments prepared from the copolyamide according to the present invention have a dense internal structure.

The extruding solution can also be processed into a film or sheet using customary spreading or extruding processes.

Filaments or films prepared by the above-described extruding processes are customarily subjected to a drawing process which improves not only the mechanical properties, for example the tensile strength and the modulus of elasticity, but also the thermal properties, for example the thermal stability, of the filaments or sheets thus prepared.

Filaments of the copolyamides according to the present invention are in general drawn to achieve a high mechanical strength and a high modulus of elasticity. The draw ratio employed is customarily about 1:3 to 1:25, preferably about 1:8 to 1:20. The drawing temperature is in general between 250° and 420° C., preferably between 330° and 410° C. The lower working temperature leads to a lower energy consumption for the drawing process, which is readily carried out.

Drawing can be carried out in a single stage, in two stages or in multiple stages using a hotplate or a cylindrical heater. Moreover, the drawn filaments or sheets can be subjected to a further heat treatment at the same or a higher temperature in order to improve their crystalline structure. It may be pointed out in this connection that the copolyamide according to the present invention is surprisingly advantageous not only in respect of its solubility in customary organic solvents but, following the preparation of the films or sheets, is readily drawable under "mild" operating conditions.

The formed articles according to the present invention, such as filaments, fibers, pulp, films or membranes made of a copolyamide according to the present invention, which have excellent mechanical and thermal properties, can be used industrially in various ways, for example as reinforcing materials for the fabric layers of car tires and other rubber articles and also objects made of thermoplastic and/or thermosetting resins, as heat-resistant insulation materials, for manufacturing filter fabrics and as lightweight insulation materials. Films or sheets made of a copolyamide according to the present invention can also be used as membranes for separation processes or as heat-resistant electric insulation materials. For insulation purposes it is also possible to apply a polymer solution as a film to other objects and then to remove the solvent.

Further properties and advantages of the invention will now be more particularly described with reference to examples. It will be understood, however, that the invention is not restricted to the embodiment examples. On the contrary, on the basis of the embodiment examples the person skilled in the art has many possible modifications and/or additions at his disposal without having to depart from the basic concept of the invention.

The proportions of dicarboxylic acid components and diamine components were calculated separately to add up to 100 mol %. The inherent viscosities were determined as described earlier.

EXAMPLE 1

Aromatic copolyamide from 100 mol % of terephthaloyl chloride, 50 mol % of 3,3'-dimethylbenzidine, 25 mol % of p-phenylenediamine and 25 mol % of m-phenylenediamine.

339.7 g (1.6 mol) of 3,3'-dimethylbenzidine, 86.5 g (0.8 mol) of p-phenylenediamine and 86.5 g (0.8 mol) of m-phenylenediamine are dissolved in 13.77 l of dry N-methylpyrrolidone under nitrogen and reacted with 648 g (3.19 mol) of pulverulent terephthaloyl chloride at between 29° and 55.4° C. in the course of 31 minutes. The molecular weight increase is stopped by adding 5.0 g (0.064 mol) of acetyl chloride. The batch is neutralized with 296 g of a 65 percent suspension of calcium oxide (96% CaO) in N-methylpyrrolidone and heated to 110° C. in the course of an hour.

The solution contains 6% of copolyamide and 2.3% of $CaCl_2$. The dissolved polyamide has an inherent viscosity of 6.00 dl/g.

The solution is filtered, devolatilized and spun by a dry-jet wet-spinning process. To this end it is spun downward through a spinneret with 100 holes each 0.15 mm in diameter, situated 40 mm above the coagulation bath. The coagulation bath has a temperature of 80° C. and comprises a solution of 35% of N-methylpyrrolidone in water. The take-off speed is 10 m/min. The filaments are hauled through washing baths, then over drying godets (120° C., 160° C., 250° C.) and finally over four hotplates at 350° C., 370° C., 390° C. and 390° C. and taken off at 240.4 m/min. Here as in the examples which follow the take-off speed is determined in such a way that the filaments undergo drawing to about 80% of the maximum draw ratio. Then the multifilament yarn is here and in the examples which follow provided with a protective twist corresponding to $a_m = 30$ (DIN 53 832 Part 1) and then examined.

In Example 1, the filament linear density is 1.32 dtex (DIN 53 830) and the tenacity is 159 cN/tex coupled with a breaking extension of 3.4% (DIN 53 834 Part 1). The initial modulus is 55 N/tex. It is determined from the gradient of the load-extension diagram at between 0.3 and 0.5% extension.

This run was repeated using the same monomer composition of the spinning solution but with a polymer content of 7% and a calcium chloride content of 2.7%. The inherent viscosity of the isolated polymer was 4.86 dl/g. Spinning was carried out in the same way as above, but the hotplate temperatures were 330°, 350°, 370° and 370° C. The total draw ratio was 11.4:1. The filaments had the following properties: linear density 1.83 dtex, tenacity 135 cN/tex: extension 3.3% and initial modulus 52 N/tex.

The same method was used to prepare a polymer solution from the same monomer composition but containing 8% of polymer and 3.1% of calcium chloride. The inherent viscosity of the isolated polymer was 4.12 dl/g. The polymer solution was wet-spun, the spinneret being immersed in the coagulation bath, and drawn at hotplate temperatures of 360°, 380° and 400° C. The draw ratio was 9.6:1 and produced filaments having the following properties: linear density 1.79 dtex; breaking strength 129 cN/tex; breaking extension 3.3%; initial modulus 51 N/tex.

EXAMPLES 2 TO 11

The procedure of Example 1 was applied under the reaction conditions indicated in the table using the starting materials mentioned there to prepare further aromatic polyamides according to the present invention and process them into filaments.

The key to the abbreviations used in the table is as follows:

TPC = terephthaloyl chloride;
IPC = isophthaloyl chloride;
PPD = p-phenylenediamine;
MPD = m-phenylenediamine;
DMB = 3,3'-dimethylbenzidine;
DCIB = 3,3'-dichlorobenzidine;
DMOB = 3,3'-dimethoxybenzidine;
NMP = N-methylpyrrolidone;
W = wet spinning;
DW = dry-wet spinning.

| | \multicolumn{10}{c}{Example} | | | | | | | | | |
|---|---|---|---|---|---|---|---|---|---|---|
| | 2 | 3 | 4 | 5 | 6 | 7 | 8 | 9 | 10 | 11 |
| TPC | | | | | | | | | | |
| mol | 3.19 | 3.39 | 3.19 | 3.19 | 2.55 | 3.23 | 0.8 | 2.8 | 3.19 | 0.36 |
| mol-% | 99.7 | 99.7 | 99.7 | 99.7 | 79.7 | 100.9 | 100 | 100 | 99.7 | 100 |
| g | 648 | 688.2 | 647.7 | 647.7 | 518.2 | 655.7 | 162.4 | 568.3 | 647.7 | 73.1 |
| IPC | | | | | | | | | | |
| mol | — | — | — | — | 0.64 | — | — | — | — | — |
| mol-% | — | — | — | — | 20 | — | — | — | — | — |
| g | — | — | — | — | 129.9 | — | — | — | — | — |
| PPD | | | | | | | | | | |
| mol | 1.12 | 1.19 | 1.28 | 1.28 | 1.44 | 1.28 | 0.28 | 1.54 | 1.28 | 0.108 |
| mol-% | 35 | 35 | 40 | 40 | 45 | 40 | 35 | 55 | 40 | 30 |
| g | 121.1 | 128.6 | 138.4 | 138.4 | 155.7 | 138.4 | 30.3 | 166.5 | 138.4 | 11.7 |
| MPD | | | | | | | | | | |
| mol | 0.64 | 0.68 | 0.64 | 0.48 | — | 0.64 | — | 0.7 | 0.64 | — |
| mol-% | 20 | 20 | 20 | 15 | — | 20 | — | 25 | 20 | — |
| g | 69.2 | 73.5 | 69.2 | 51.9 | — | 69.2 | — | 75.7 | 69.2 | — |
| DMB | | | | | | | | | | |
| mol | 1.44 | 1.53 | 1.28 | 1.44 | 1.76 | — | 0.36 | 0.56 | — | 0.216 |
| mol-% | 45 | 45 | 40 | 45 | 55 | — | 45 | 20 | — | 60 |
| g | 305.7 | 324.8 | 271.7 | 305.7 | 373.6 | — | 76.4 | 118.9 | — | 45.85 |
| Others | — | — | | | | DCIB | DMOB-amino anisole | — | DMOB | diethyl-diaminobenzamide |
| mol | — | — | — | — | — | 1.28 | 0.16 | — | 1.28 | 0.036 |
| mol-% | — | — | — | — | — | 40 | 20 | — | 40 | 10 |
| g | — | — | — | — | — | 324.0 | 22.1 | — | 312.7 | 7.46 |
| NMP g | 13 923 | 10 758 | 13 662 | 13 940 | 14 443 | 14 485 | 3 908 | 13 457 | 14 304 | 2 084 |
| Reaction temperature °C. | 29.9–53.1 | 30.9–49.4 | 30.1–55.7 | 29.3–55.5 | 31.3–54.9 | 29.7–59.3 | 13–64 | 30.8–57.7 | 30.1–50.1 | 9–70 |
| Reaction time min | 25 | 11 | 28 | 27 | 28 | 70 | 33 | 49 | 14 | 102 |
| Acetyl chloride g | 5.0 | 5.3 | 5.0 | 5.0 | 5.0 | | 1.3 | 4.4 | 5.0 | 0.6 |
| CaO[f] g | 296 | 315 | 296 | 29.6 | 296 | 296 | 74 | 259 | 296 | 33.5 |
| Polymer concentration % | 6 | 8 | 6 | 6 | 6 | 6 | 5.5 | 5 | 5 | 5 |
| CaCl$_2$ conc. % | 2.34 | 3.12 | 2.38 | 2.34 | 2.26 | 2.25 | 2.10 | 2.14 | 2.28 | 1.79 |
| Polymer viscosity $\eta_{inh}$ | 5.84 | 4.02 | 5.25 | 5.43 | 5.05 | 4.96 | 4.62 | 5.86 | 5.81 | 6.10 |
| Spinning process | N | N | TN | TN | TN | TN | N | TN | TN | N |
| Spinning solution temp. °C. | 100 | 100 | 100 | 100 | 100 | 100 | 100 | 100 | 100 | 100 |
| Jet holes | 100 | 100 | 100 | 100 | 100 | 100 | 100 | 100 | 100 | 100 |
| Jet hole diam. mm | 0.15 | 0.15 | 0.15 | 0.15 | 0.15 | 0.15 | 0.10 | 0.15 | 0.15 | 0.15 |

-continued

| | Example | | | | | | | | | |
|---|---|---|---|---|---|---|---|---|---|---|
| | 2 | 3 | 4 | 5 | 6 | 7 | 8 | 9 | 10 | 11 |
| Distance jet-coagulation bath mm | / | / | 40 | 40 | 40 | 40 | / | 20 | 40 | / |
| Coagulation bath composition % of NMP | 35 | 35 | 35 | 35 | 35 | 35 | 35 | 35 | 35 | 35 |
| Coagulation bath temp. °C. | 80 | 80 | 80 | 80 | 80 | 80 | 80 | 80 | 80 | 80 |
| Take-off speed m/min | 12 | 16 | 12 | 12 | 14 | 14 | 16 | 16 | 16 | 16 |
| Drying godet temp. °C. | 120,160,280 | 120,160 | 120,160,280 | 140,240 | 120,160,240 | 120,240 | 120,160,240 | 120,160,240 | 120,160,240 | 120,160,240 |
| Hotplate temp. °C. | 320–360 | 320–360 | 320–360 | 350–390 | 320–360 | 300–340 | 320–360 | 350–390 | 240–330 | 340–390 |
| Take-off speed m/min | 150.3 | 107.8 | 90.0 | 96.6 | 85.6 | 80.0 | 111.4 | 98.7 | 87.4 | 115.3 |
| Filament linear density dtex | 1.43 | 1.55 | 1.75 | 3.97 | 2.20 | 2.04 | 1.49 | 1.86 | 2.36 | 1.66 |
| Tenacity cN/tex | 196 | 158 | 165 | 170 | 156 | 132 | 131 | 148 | 124 | 126 |
| Extension % | 3.8 | 3.0 | 3.4 | 3.5 | 2.8 | 3.4 | 3.2 | 3.5 | 3.6 | 2.5 |
| Initial modulus N/tex | 63 | 65 | 57 | 59 | 64 | 50 | 53 | 49 | 44 | 61 |

[1] 65 percent suspension of 96 percent CaO in NMP

What is claimed is:

1. A copolyamide which is soluble in an organic polyamide solvent and has an inherent viscosity, measured on a solution of 0.5 g of polyamide in 100 ml of 98% sulfuric acid at 25° C., of about 3.5 to 6.6 dl/g, containing the recurring structural units of the formulae Ia, Ib, Ic and Id and with or without the recurring structural units of the formula Ie or If or combinations thereof —OC—Ar¹—C—      (Ia), —NH—Ar²—NH—      (Ib), —NH—Ar³—NH—      (Ic),

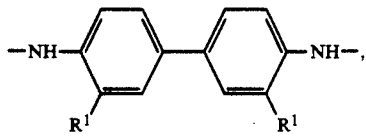
(Id)

—OC—R²—CO—      (Ie),

—NH—R³—NH—      (If), where the sum total of the recurring structural units of the formulae Ia, Ib, Ic and Id is at least 95 mol % and the recurring structural units of the formula Ie or If or a mixture of Ie and If are up to 5 mol % and the mole fraction of the recurring structural units of the formulae Ia with or without Ie corresponds substantially to the mole fraction of the recurring structural units Ib, Ic, Id with or without If, and where Ar¹ is a divalent aromatic radical having valence bonds in the para or a comparable coaxial or parallel position to one another and which with or without has one or more substituents which are inert toward carbonyl chlorides, Ar² has one of the meanings defined for Ar¹, Ar³ is a divalent monocyclic or fused polycyclic aromatic radical having valence bonds in the meta or a comparable kinked position to one another and which with or without has one or more substituents which are inert toward carbonyl chlorides, R¹ is a lower alkyl radical, a lower alkoxy radical or a halogen atom, R² is a divalent, aliphatic, cycloaliphatic or araliphatic radical, and R³ has one of the meanings defined for R², with the proviso that within one and the same polymer molecule the radicals Ar¹, Ar², Ar³, R¹, R² and R³ is the same or different within the given definitions and that the proportions of the recurring structural units of the formulae Ib, Ic and Id, based on the total amount of these structural units, are within the corner points of the following region:

point O corresponds to 45 mol % of the radical of the formula Ib, 40 mol % of the radical of the formula Ic and 15 mol % of the radical of the formula Id;
point P corresponds to 65 mol % of the radical of the formula Ib, 20 mol % of the radical of the formula Ic and 15 mol % of the radical of the formula Id;
point Q corresponds to 65 mol % of the radical of the formula Ib, 5 mol % of the radical of the formula Ic and 30 mol % of the radical of the formula Id;
point R corresponds to 30 mol % of the radical of the formula Ib, 5 mol % of the radical of the formula Ic and 65 mol % of the radical of the formula Id;
point S corresponds to 20 mol % of the radical of the formula Ib, 15 mol % of the radical of the formula Ic and 65 mol % of the radical of the formula Id; and
point T corresponds to 20 mol % of the radical of the formula Ib, 40 mol % of the radical of the formula Ic and 40 mol % of the radical of the formula Id.

2. A copolyamide which is soluble in an organic polyamide solvent and has an inherent viscosity, measured on solutions of 0.5 g of polyamide in 100 ml of 98% sulfuric acid at 25° C., of about 3.5 to 6.6 dl/g, containing the recurring structural units of the formula Ia, Ib, Id and Ig and with or without the recurring structural units of the formulae Ic, Ie or If or combinations thereof —OC—Ar¹—C—      (Ia), —NH—Ar²—NH—      (Ib), —NH—Ar³—NH—      (Ic),

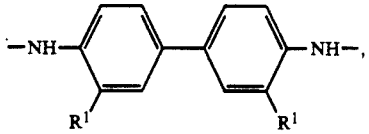
(Id)

—OC—R²—CO—      (Ie),

—NH—R³—NH—      (If),

—OC—Ar⁴—CO—      (Ig), where the sum total of the recurring structural units of the formulae Ia, Ib, Id and Ig with or without Ic is at least 95 mol % and the recurring structural units of the formulae Ie or a mixture of Ie and If, is up to 5 mol % and the mole fraction of the recurring structural units of the formulae Ia and Ig with or without Ie corresponds substantially to the mole fraction of the recurring structural units Ib and Id with or without Ic or If or a mixture of Ic and If, and where Ar¹, Ar², Ar³, R¹, R² and R³ are each as defined in claim 1, Ar⁴ is a divalent monocyclic or fused polycyclic aromatic radical having valence bonds in the meta or in a comparable kinked position relative to one another and which with or without has one or more substituents which are inert toward carbonyl chlorides, with the proviso that within one and the same polymer molecule the radicals Ar¹, Ar², Ar³, Ar⁴, R¹, R² and R³ is the same or different within the given definitions and that the proportions of the recurring structural units of formulae Ia, Ib, Id and Ig with or without Ic, based on the total amount of these structural units, are within the corner points of the following region:

point V corresponds to 72.5 mol % of the sum total of the recurring structural units of the formulae Ia and Ib, 22.5 mol % of the recurring structural units of the formula Ig or the sum total of the recurring structural units of the formulae Ic and Ig, and 5 mol % of the recurring structural units of the formula Id;

point W corresponds to 82.5 mol % of the sum total of the recurring structural units of the formulae Ia and Ib, 12.5 mol % of the recurring structural units of the formula Ig or the sum total of the recurring structural units of the formulae Ic and Ig, and 5 mol % of the recurring structural units of the formula Id;

point X corresponds to 82.5 mol % of the sum total of the recurring structural units of the formulae Ia and Ib, 2.5 mol % of the recurring structural units of the formula Ig or the sum total of the recurring structural units of the formulae Ic and Ig, and 15 mol % of the recurring structural units of the formula Id;

point Y corresponds to 60 mol % of the sum total of the recurring structural units of the formula Ia and Ib, 2.5 mol % of the recurring structural units of the formula Ig or the sum total of the recurring structural units of the formulae Ic and Ig, and 37.5 mol % of the recurring structural units of the formula Id;

point Z corresponds to 52.5 mol % of the sum total of the recurring structural units of the formulae Ia and Ib, 22.5 mol % of the recurring structural units of the formula Ig or the sum total of the recurring structural units of the formulae Ic and Ig, and 25 mol % of the recurring structural units of the formula Id;

3. The copolyamide as claimed in claim 1, wherein $Ar^1$ or $Ar^2$ or both $Ar^1$ and $Ar^2$ are 1,4-phenylene.

4. The copolyamide as claimed in claim 2, wherein $Ar^1$ or $Ar^2$ or both $Ar^1$ and $Ar^2$ are 1,4-phenylene.

5. The copolyamide as claimed in claim 1, wherein $Ar^3$ or $Ar^4$ or both $Ar^3$ and $Ar^4$ are 1,4-phenylene.

6. The copolyamide as claimed in claim 2, wherein $Ar^3$ or $Ar^4$ or both $Ar^3$ and $Ar^4$ are 1,4-phenylene.

7. The copolyamide as claimed in claim 1, where the proportions of the recurring structural units of the formulae Ib, Ic and Id, based on the total amount of these structural units, lie within the corner points of the following region:

point O' corresponds to 55 mol % of the radicals of formula Ib, 30 mol % of the radicals of formula Ic and 15 mol % of the radicals of formula Id, point P' corresponds to 60 mol % of the radicals of formula Ib, 25 mol % of the radicals of formula Ic and 15 mol % of the radicals of formula Id, point Q' corresponds to 60 mol % of the radicals of formula Ib, 5 mol % of the radicals of formula Ic and 35 mol % of the radicals of formula Id, point R' corresponds to 30 mol % of the radicals of formula Ib, 5 mol % of the radicals of formula Ic and 65 mol % of the radicals of formula Id, point S' corresponds to 20 mol % of the radicals of formula Ib, 15 mol % of the radicals of formula Ic and 65 mol % of the radicals of formula Id, point T' corresponds to 20 mol % of the radicals of formula Ib, 30 mol % of the radicals of formula Ic and 50 mol % of the radicals of formula Id.

8. The copolyamide as claimed in claim 2, wherein the proportions of the recurring structural units of the formulae Ia, Ib, Id and Ig or of the formulae Ia, Ib, Ic, Id and Ig, based on the total amount of these structural units, lie within the corner points of the following region:

point V' corresponds to 75 mol % of the sum total of the recurring structural units of the formula Ia and Ib, 20 mol % of the recurring structural units of the formula Ig or the sum total of the recurring structural units of the formulae Ic and Ig, and 5 mol % of the recurring structural unit of the formula Id;

point W' corresponds to 80 mol % of the sum total of the recurring structural units of the formula Ia and Ib, 15 mol % of the recurring structural units of the formula Ig or the sum total of the recurring structural units of the formulae Ic and Ig, and 5 mol % of the recurring structural unit of the formula Id;

point X' corresponds to 80 mol % of the sum total of the recurring structural units of the formula Ia and Ib, 2.5 mol % of the recurring structural units of the formula Ig or the sum total of the recurring structural units of the formulae Ic and Ig, and 17.5 mol % of the recurring structural unit of the formula Id;

point Y' corresponds to 62.5 mol % of the sum total of the recurring structural units of the formula Ia and Ib, 2.5 mol % of the recurring structural units of the formula Ig or the sum total of the recurring structural units of the formulae Ic and Ig, and 35 mol % of the recurring structural unit of the formula Id;

point Z' corresponds to 55 mol % of the sum total of the recurring structural units of the formula Ia and Ib, 20 mol % of the recurring structural units of the formula Ig or the sum total of the recurring structural units of the formulae Ic and Ig, and 25 mol % of the recurring structural unit of the formula Id.

9. The copolyamide as claimed in claim 1, wherein $Ar^1$ and $Ar^2$ are each 1,4-phenylene, $Ar^3$ is 1,3-phenylene and $R^1$ is $C_1$–$C_4$-alkyl, and the proportions of the recurring structural units of the formulae Id, Ic and Id, based on the total amount of these structural units, are within the following limits:

structural unit of the formula Ib, 30–40 mol %, structural unit of the formula Ic: 10—30 mol %, and structural unit of the formula Id: 35-57 mol %.

10. A copolyamide as claimed in claim 9, wherein $R^1$ is methyl.

11. A copolyamide as claimed in claim 9, wherein said proportions of the recurring structural units are within the following limits:

structural unit of the formula Ib: 34 to 36 mol %, structural unit of the formula Ic: 18-22 mol %, and structural unit of the formula Id: 43-57 mol %.

12. A formed structure comprising a copolyamide as claimed in claim 1.

13. A formed structure comprising a copolyamide as claimed in claim 2.

14. A formed structure according to claim 12, wherein said structure is a filament, fiber, pulp, film, sheet or membrane.

15. A formed structure according to claim 13, wherein said structure is a filament, fiber, pulp, film, sheet or membrane.

* * * * *